(12) United States Patent
Ansbacher et al.

(10) Patent No.: US 10,707,788 B2
(45) Date of Patent: Jul. 7, 2020

(54) VEHICLE TRANSIENT VOLTAGE CONTROL

(71) Applicant: Ford Global Technologies, LLC, Dearborn, MI (US)

(72) Inventors: Todd Ansbacher, Westland, MI (US); Alan Francis Judge, Farmington Hills, MI (US); Jeffrey Raymond Mohr, Shelby Township, MI (US); Frederick Shell, Detroit, MI (US); Michael J. Irby, Monroe, MI (US); Karen Price, Pinckney, MI (US); Gabriel Jim, Canton, MI (US); Christopher Semanson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 748 days.

(21) Appl. No.: 14/811,388

(22) Filed: Jul. 28, 2015

(65) Prior Publication Data

US 2017/0033717 A1    Feb. 2, 2017

(51) Int. Cl.
*H02P 9/00* (2006.01)
*H02J 7/24* (2006.01)
*H02P 9/48* (2006.01)

(52) U.S. Cl.
CPC ............. *H02P 9/006* (2013.01); *H02J 7/243* (2020.01); *H02J 7/2434* (2020.01); *H02P 9/48* (2013.01); *Y02T 10/92* (2013.01)

(58) Field of Classification Search
CPC . H02P 9/006; H02P 9/48; H02J 7/2434; H02J 7/243

USPC ........................................... 322/27, 28
See application file for complete search history.

(56) References Cited

U.S. PATENT DOCUMENTS

| | | | | |
|---|---|---|---|---|
| 3,571,657 A * | 3/1971 | Domann | ............... | H02J 7/1461 322/28 |
| 5,023,539 A * | 6/1991 | Miller | .................... | H02H 7/067 322/28 |
| 5,712,786 A * | 1/1998 | Ueda | ..................... | F02D 31/005 123/339.1 |
| 5,880,577 A * | 3/1999 | Aoyama | ............... | H02J 7/1446 322/18 |
| 6,005,372 A * | 12/1999 | Kouwa | .................... | H02J 7/245 320/104 |
| 6,121,757 A * | 9/2000 | Takahashi | ............... | H02J 7/163 322/27 |
| 6,208,127 B1 | 3/2001 | Doluca | | |
| 7,009,366 B2 * | 3/2006 | Maehara | ................. | H02J 7/244 320/123 |
| 7,061,736 B2 | 6/2006 | Gorgerino et al. | | |
| 7,421,604 B1 * | 9/2008 | Mimberg | ................. | G06F 1/26 713/300 |

(Continued)

*Primary Examiner* — Viet P Nguyen
(74) *Attorney, Agent, or Firm* — Frank Lollo; Brooks Kushman P.C.

(57) ABSTRACT

A vehicle power system includes a controller that reduces a voltage setpoint of an alternator by a predetermined amount in response to a magnitude of electric charge provided by the alternator during a predetermined time period exceeding a first threshold and a rate of change of power output by the alternator exceeding a second threshold during the time period. The controller also regulates an output voltage of the alternator based on the setpoint.

14 Claims, 4 Drawing Sheets

(56) References Cited

U.S. PATENT DOCUMENTS

| | | | | |
|---|---|---|---|---|
| 7,441,137 B1* | 10/2008 | Mimberg | | G05F 1/462 713/300 |
| 7,552,006 B2* | 6/2009 | Maeda | | G01R 31/3606 322/25 |
| 8,457,804 B2* | 6/2013 | Oi | | G05B 5/01 322/11 |
| 2002/0171401 A1* | 11/2002 | Naidu | | H02H 7/067 322/28 |
| 2004/0150375 A1* | 8/2004 | Namuduri | | H02H 7/067 322/28 |
| 2005/0140342 A1* | 6/2005 | Maehara | | H02J 7/1438 322/36 |
| 2006/0049807 A1* | 3/2006 | Yao | | H02P 9/30 322/22 |
| 2006/0066287 A1* | 3/2006 | Obayashi | | F02D 41/0007 322/25 |
| 2006/0091864 A1* | 5/2006 | Watanabe | | H02P 9/305 322/28 |
| 2007/0114976 A1* | 5/2007 | Inokuchi | | H02J 7/1461 322/28 |
| 2008/0157539 A1* | 7/2008 | Tani | | H02J 1/14 290/40 C |
| 2009/0039838 A1* | 2/2009 | Maehara | | H02J 7/245 322/19 |
| 2009/0302607 A1* | 12/2009 | Kenzaki | | H02P 9/007 290/43 |
| 2010/0225284 A1* | 9/2010 | Aoyama | | H02P 9/305 322/19 |
| 2011/0062708 A1* | 3/2011 | Prochaska | | F02D 29/06 290/7 |
| 2011/0109278 A1* | 5/2011 | Kikuchi | | H02P 9/48 322/59 |
| 2012/0290852 A1* | 11/2012 | Rahardjo | | G06F 1/26 713/300 |
| 2014/0203788 A1* | 7/2014 | Andrejak | | H02P 9/04 322/14 |
| 2014/0244058 A1 | 8/2014 | Zweigle et al. | | |
| 2014/0292285 A1* | 10/2014 | Kadric | | H02P 9/10 322/28 |
| 2015/0084416 A1* | 3/2015 | Nishibayashi | | H02J 3/32 307/12 |

* cited by examiner

VEHICLE TRANSIENT VOLTAGE CONTROL

TECHNICAL FIELD

This application is related to a control system for an alternator of a vehicle configured to selectively respond to a high current load dump.

BACKGROUND

Most modern vehicles include an alternator. An alternator is an electrical generator that converts mechanical energy to electrical energy in the form of a current. The alternator may be configured such that the current may be a direct current (DC) or an alternating current (AC). An alternator may include a rotor configured to create a rotating magnetic field and a stator configured to capture the magnetic field and convert the rotational energy of the rotating magnetic field to an AC or DC current. An alternator may use a permanent magnet to create its magnetic field or an alternator may use a field coil to create its magnetic field. Alternators may be self-regulating in that the amount of power that the vehicle requires to satisfy various load causes the alternator output to automatically adjust itself for any given output voltage. However, because the alternator is a mechanical device made up of, among other things, a rotor and stator windings, it is sensitive to large load disturbances being turned on and off. When a load is quickly removed, the alternator has a period of time where the inertia of the system will cause the alternator to continue producing the voltage needed to run the load even with the load being disconnected from the system.

SUMMARY

A vehicle power system includes an alternator and a controller. The controller, in response to a magnitude of electric charge provided by the alternator during a predetermined time period exceeding a first threshold and a rate of change of power output by the alternator exceeding a second threshold during the time period, reduces a voltage setpoint of the alternator by a predetermined amount, and regulates an output voltage of the alternator based on the setpoint.

A method of regulating alternator output voltage includes receiving data indicative of an amount of electric charge provided by an alternator to a load and a magnitude of power output by the alternator. The method also includes, in response to the amount exceeding a first threshold and the magnitude exceeding a second threshold, reducing an output voltage setpoint of the alternator by a predetermined amount, and regulating the output voltage of the alternator based on the setpoint A vehicle power system includes an alternator and a controller. The controller selectively alters by a predetermined amount an output voltage setpoint for the alternator in response to a magnitude of electric charge and a rate of change of power output by the alternator crossing respective thresholds during a predetermined time period.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Most modern alternators are self-regulating devices in that an amount of power a vehicle requires to satisfy various loads causes the alternator output to automatically adjust itself for any given output voltage. However, because the alternator is a mechanical device made up of a rotor and stator windings, once a field is induced in a winding, collapsing the magnetic field associated with the winding takes time. Because of the period of time required to collapse the field, an alternator is sensitive to large load disturbances being connected and disconnected. The issue is that as a load is quickly removed, the alternator has a period where the inertia of the system will be producing the voltage and current needed to run the load that is now no longer connected. The result is that the output voltage may increase causing a voltage spike and if the load disconnect is large enough, the spike may be greater than a maximum voltage of modules coupled to the alternator. The modules may then shut down due to the over voltage and reset once the voltage drops below the maximum voltage (e.g., 16 voltage). Here, processes, methods and algorithms are presented to detect, mitigate and maintain operation of a vehicle electrical system following the removal of a large load.

This can be broken down into 3 steps: detection, reaction, and return to normal operation. The detection algorithm is designed to detect any large increases in alternator load. To increase reliability and accuracy, two input signals are used. One signal is to detect large departures in load and the other is to ensure that the departure was enough to cross a threshold. Time differentiation of the incoming load indicator signal allows the algorithm to only consider the rate of change. A threshold detection ensures that any large increase in rate of change has forced the alternator close enough to full field that if the load connected to the alternator system were to suddenly be removed, a voltage spike having a magnitude large enough to disrupt the electrical system would ensue.

A differencing high pass filter of the incoming load signal needs light filtering to be able to accurately detect a rate of change. This filtering of the signal increases the stability of the system. Also, hysteresis may then be applied to each of these signals such that chattering does not occur. The importance of considering large increases and not just waiting for the alternator load indicator to go over a maximum value is that the algorithm is trying to detect large loads that would affect the system voltage all at once, not cumulative smaller loads that switch on and off. This system or method of detection can be used in addition to the use of a discrete signal directly coupled to the alternator or the regulator of the alternator that would reduce ambiguity from the algorithm. This can be performed considering current or power, whereas a magnitude of power is a function of a magnitude of current with the voltage generally being held constant by the regulator even in considering the reduction of the voltage setpoint.

After successfully detecting a large increase and the load indicator crossing over a threshold, the next step is the reaction step. In the reaction step, it is important that the system quickly takes the existing set point and then incrementally decreases it to a voltage set point that is deemed nominal if the load were to suddenly remove itself and the spike would cause no interference to the rest of the vehicle systems.

After the reaction step, the system may return to a nominal state. When the set point is reduced to compensate for a large load drawing power from the alternator, it is desirable to return the setpoint to a nominal setpoint as soon as possible. This may be in response to determination of a release of the large load by looking at operation including a negative rate of change in the alternator load signal exceeding a limit, the alternator load signal going below a certain threshold, a large rate of change in the low voltage system voltage, and a discrete signal that tells the system the protection is no longer needed as the load is gone. Using a combination of these conditions, the algorithm then releases the setpoint and ramps the setpoint back to a nominal system voltage.

Figure 1:
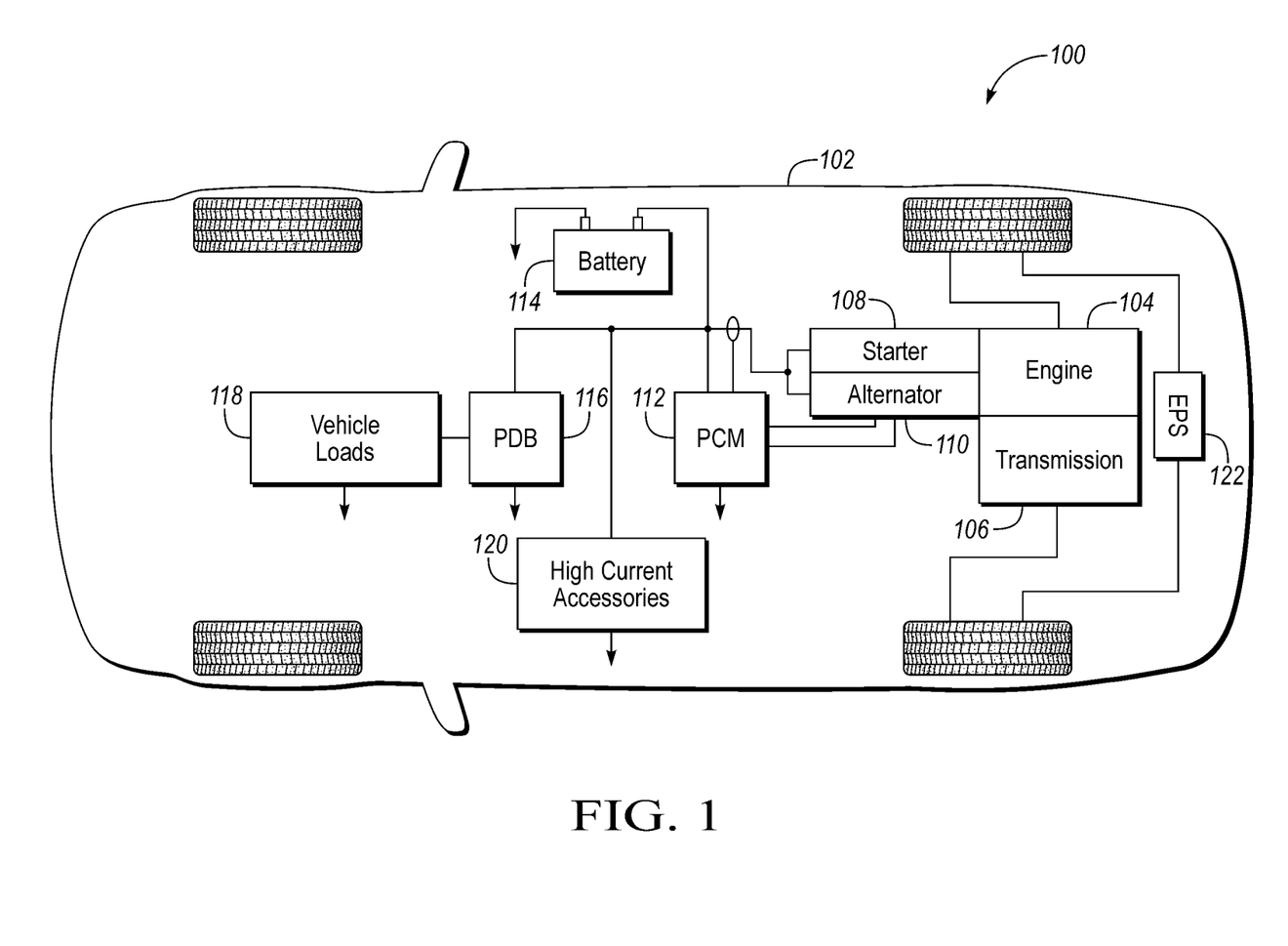
FIG. 1 is a block topology of a vehicle having an alternator based electrical system.

FIG. 1 is a block topology of a vehicular system 100 having an alternator based electrical system. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. The vehicle 102 includes an engine 104. The engine 104 may be an internal combustion engine such as a gasoline, diesel, or natural gas engine. The engine 104 may be coupled to a transmission 106 to propel the vehicle 102. The engine 104 may be coupled with a starter motor 108 and an alternator 110. The starter motor 108 may be a DC electric motor or may be an AC motor such as used in some hybrid vehicles. The starter motor 108 and the alternator 110 may be a single electric machine that is configurable to either generate an output voltage when configured as an alternator, or output a torque to rotate the engine 104 when configured as a starter. A controller within a module such as a Powertrain Control Module (PCM) 112 may control the alternator 110. A portion of the output of the alternator 110 may be stored in a DC battery 114, such as a lead-acid battery, Li-ion battery, or other vehicle battery. Also, energy generated from the alternator 110 may be distributed via a Power Distribution Box (PDB) 116 also referred to as a junction box. It should be noted that the illustrated system 100 is merely an example, and more, fewer, and/or differently located elements may be used.

The PCM 112 may include one or more processors configured to perform instructions, commands and other routines in support of the processes described herein. For instance, the PCM 112 may be configured to execute instructions to control various vehicle systems including the engine 104, the transmission 106 and other vehicle loads 118 including high current accessories 120 and electric power steering (EPS) 122. Such instructions and other data may be maintained in a non-volatile manner using a variety of types of computer-readable storage medium. The computer-readable medium (also referred to as a processor-readable medium or storage) includes any non-transitory medium (e.g., a tangible medium) that participates in providing instructions or other data that may be read by a processor of the PCM 104 or other vehicle module. The processor may also be multiple processors in multiple computing units which each perform a part of the overall function. Computer-executable instructions may be compiled or interpreted from computer programs created using a variety of programming languages and/or technologies, including, without limitation and either alone or in combination, assembly, Java, C, C++, C #, Objective C, Fortran, Pascal, Java Script, Python, Perl, and PL/SQL.

The PCM 112 may be further configured to communicate with other components of the vehicle 102 via one or more in-vehicle networks. The in-vehicle networks may include one or more of a vehicle controller area network (CAN), local interconnect network (LIN), an Ethernet network, a media oriented system transfer (MOST), and FlexRay as some examples. The in-vehicle networks may allow the computing platforms to communicate with other vehicle systems, such as other vehicle loads 118, EPS 120, and PDB 116 (which may not be present in some configurations). The PCM 112 may be configured to provide control of engine operating components (e.g., idle control components, fuel delivery components, emissions control components, etc.) and monitoring of engine operating components (e.g., status of engine diagnostic codes). A body control module and PDB 116 may be configured to manage various power control functions such as exterior lighting, interior lighting, keyless entry, remote start, and point of access status verification (e.g., closure status of the hood, doors and/or trunk of the vehicle 102). Other vehicle modules that may draw a substantial current include a climate control management module configured to provide control and monitoring of heating and cooling system components (e.g., compressor clutch and blower fan control, temperature sensor information, etc.).

Figure 2:
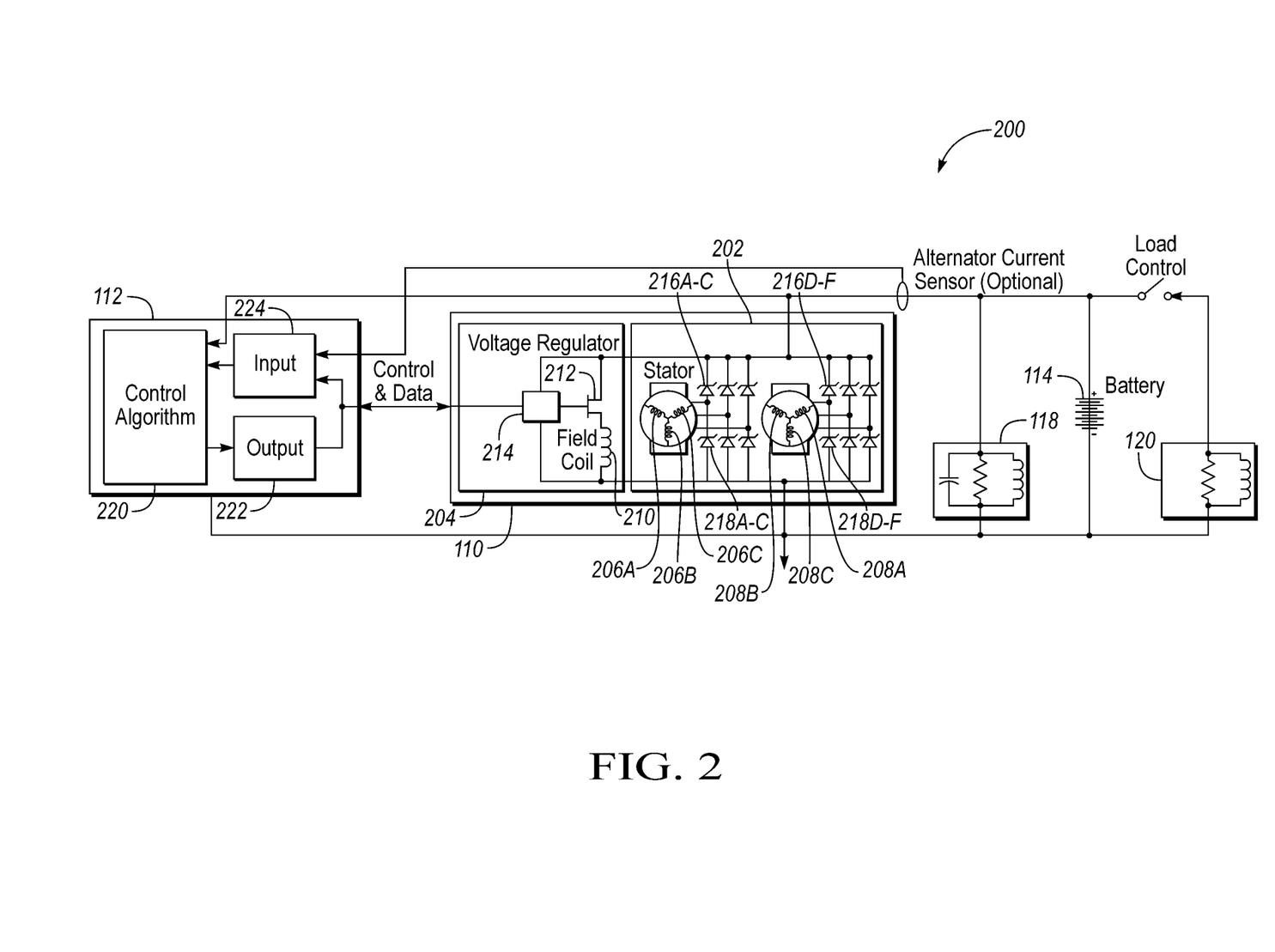
FIG. 2 is a circuit diagram of an alternator system.

FIG. 2 is a circuit diagram of an alternator system 200. The alternator 110 may include a generator 202 and a regulator 204. The generator 202 may be configured as a single stator generator or a dual stator generator. This illustration is of a dual stator generator. The first stator includes windings 206, which are shown configured as a wye connector also referred to as a 'Y'. The first stator has windings 206A, 206B, and 206C, in which each winding is connected with a pair of diodes 216A-C and 218A-C to rectify or convert the signal from an AC signal to a DC signal. Winding 206A is electrically connected with 216A and 218A, winding 206B is electrically connected with 216B and 218B, and winding 206C is electrically connected with 216C and 218C. A second stator 208 includes windings 209A, 208B, and 208C, in which each winding is connected with a pair of diodes 216D-F and 218D-F to rectify or convert the signal from an AC signal to a DC signal. Winding 208A is electrically connected with 216D and 218D, winding 208B is electrically connected with 216E and 218E, and winding 208C is electrically connected with 216F and 218F.

Regulation of the alternator is performed by controlling a current flowing in a field coil 210. The field coil 201 energizes a magnetic field that the stators rotate within to convert the rotational energy (rotating a magnetic field) into electrical energy The regulator 204 includes a field coil and a switch 212. The switch 212 is shown as a Field Effect Transistor (FET), however it may be a Bi-polar Junction Transistor (BJT), a relay or other structure to control a current flow. A driver 214 controls the switch 212. The driver 214 may be discrete logic, analog circuitry, or digital circuitry. The driver 214 is connected with a controller 112, that may include a processor 220 that drives signals via an output port 222 and receives signals from an input port 224. The input port 224 may include analog and digital inputs. If the switch is driven by analog circuitry, the switch may control a current flow into the field coil 210 by reducing the voltage across the field coil 210. Also, the switch may be driven with digital circuitry. The digital circuitry can pulse width modulate the switch such that the switch is being turned on and off according to a specific duty cycle at a specific frequency. The frequency may be a fixed frequency or a variable frequency. The pulse width modulated switch will create a fluctuating magnetic field in the field coil. The field generated may be filtered based on the frequency of the modulation and the inductance of the inductor such that a generally constant field is generated.

Figure 3:
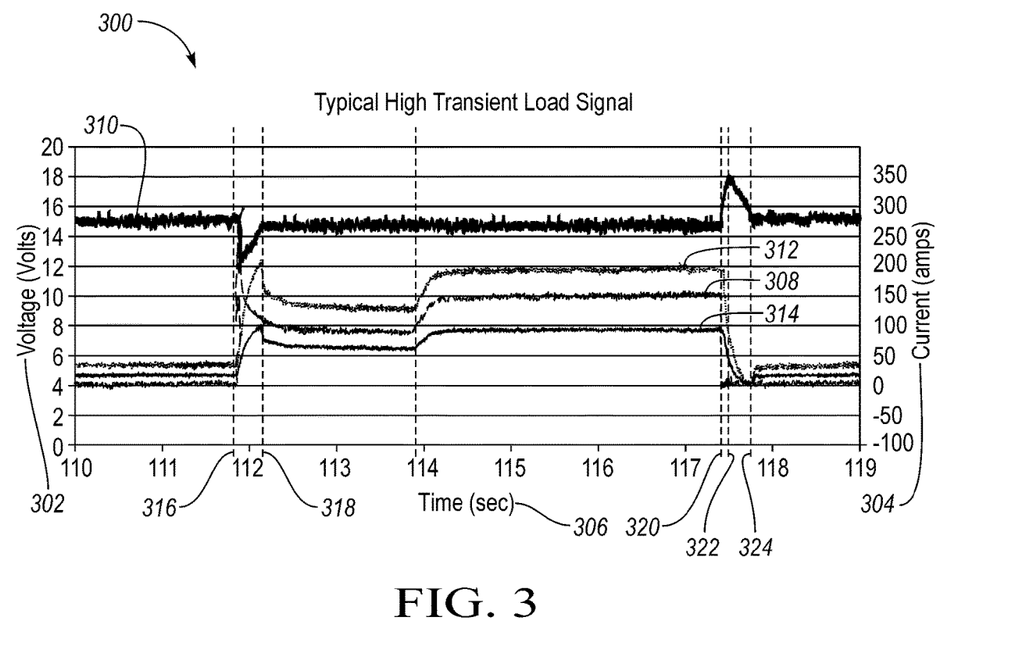
FIG. 3 is a graphical illustration of operating parameters of an alternator system in relation to time.

FIG. 3 is a graphical illustration of operating parameters of an alternator system in relation to time 300. The voltage 302 and current 304 vary in relation to time 306. The parameters shown include a load current 308, a system voltage 310, an alternator current 312, and an alternator field load signal 314. In this example, the system has a voltage of approximately 15 Volts from the point in time at 110 seconds to point 316, at which time a load is switched on. The load may be an aftermarket accessory such as a plow, winch, search light, or other accessory that draws a significant current. The system voltage 310 is reduced as the load is energized until the system voltage returns to an operational level at time 318. The system will continue to operate at the operational level, and if other loads are engaged such as shown by the point in time at 114 seconds, the regulator will continue to regulate the voltage as the current is increased to meet the load power demands. The load is disconnected at point 320. Prior to the load being disconnected, the alternator was generating power to supply to the vehicle systems including the load. As the response of the alternator is not instantaneous, when the load is disconnected, the power being supplied by the alternator is not immediately reduced thereby producing a voltage spike at point in time 322. If the load connected and disconnected is large enough to cause the regulator to drive the alternator at nearly full power, when disconnected, the system may not have the capacity to absorb that additional power that is now not being consumed. As a result, the voltage spike may increase over a high voltage threshold, such as 16V for a 12 V automotive system. Due to the voltage spike at time 322, modules in the vehicle may receive this voltage spike. Typically modules in a vehicle are configured with an over voltage shut-down. When the voltage exceeds a predetermined threshold (such as 16 Volts), the module will shut down. When the voltage drops below the threshold or a lower threshold, such as at time 324, to provide hysteresis and improve stability, the modules will reset and restart. This module restarting or rebooting may be unfavorable for vehicle owners.

Figure 4:
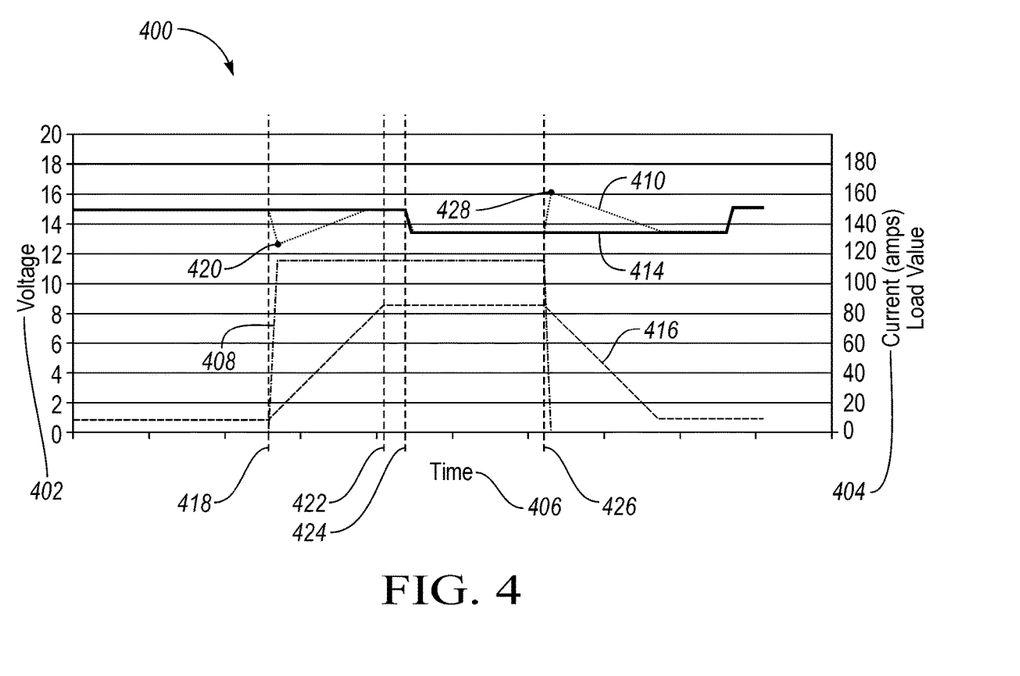
FIG. 4 is a graphical illustration of a reduction in system voltage based on alternator system parameters in relation to time to reduce an effect of a potential voltage spike.

FIG. 4 is a graphical illustration of a reduction in system voltage based on alternator system parameters in relation to time to reduce an effect of a potential voltage spike. The system operation 400 in response to a load being connected and disconnected is shown. The illustration is of voltage 402 and current 404 in relation to time 406. The voltage 402 includes a system voltage 410 and an alternator setpoint control signal 414, also referred to as a voltage setpoint. The alternator setpoint 414 may be used to control a current flowing in a field coil 210 of the alternator 110. The flow of current in the field coil 210 induces a magnetic field such that an output voltage is generated in stators 206 and 208. The current in the field coil 210 is used to regulate the output power of the alternator. The output power is related to the system voltage 410 and a current 408. The current 408 is the current output from the alternator to a load such as an internal vehicle load (e.g., HVAC fan and EPS) or an external load (e.g., winch and snow plow). When the load is engaged, the system voltage will drop as the current rises until the current can support the impedance of the load, this occurs at point 420. It is important that the load does not cause a drop in voltage greater than a minimum voltage. In the event that the voltage drops below a lower threshold, modules in the vehicle powered by the system voltage 410 may shutdown or reset.

The alternator may also include an output signal also referred to as a load indicator 416. The load indicator may be a function of a power output of the alternator or may be a function of the current 408. The load indicator 416 may be an integral of the current, such as a definite integral. A definite integral is an integral over a given time period. An integral is defined as the area under the curve, so at time 418 when the current has a rapid increase, the area under the curve over a predetermined time period will begin to increase. The increase will follow a slope until the time period encompasses the higher current flow. This can be illustrated as a difference between time 418 and time 422. The current 408 when increasing from the load being connected exhibits a rate of change increase. The rate of change increase is also referred to as a slope of current profile. The slope of the current profile may be determined by differentiation as the derivative of a profile is the slope at that point. After the predetermined time from the slope of the definite integral being zero, such as the window between time 422 and 424, the voltage setpoint 414 may be reduced to compensate for the load that is currently being energized.

When the voltage setpoint 414 is reduced, the system voltage 410 will be reduced based on the voltage setpoint 414. At time 426, the load is disconnected and the system voltage 410 results in a voltage spike at 428 based on the size of the load disconnected and the energy generated by the alternator 110. If the voltage setpoint was not reduced, the voltage spike may exceed a threshold voltage. By reducing the voltage setpoint, however, the voltage spike does not cross the threshold voltage (e.g., 18 volts). The current flowing from the alternator over a period of time measured in Amp Hours is a measurement of electric charge.

Figure 5:
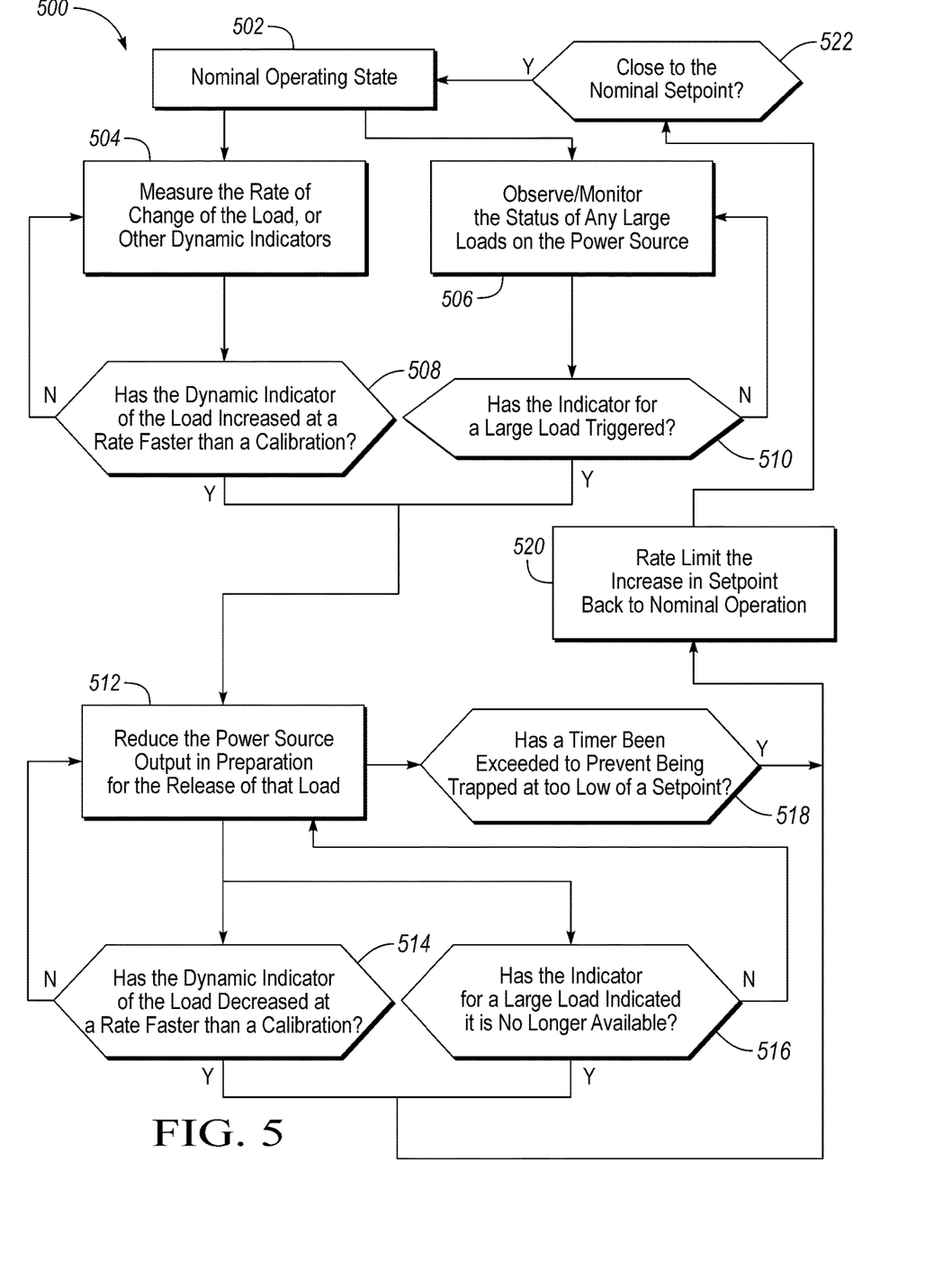
FIG. 5 is an exemplary flow diagram to control an alternator system.

FIG. 5 is an exemplary flow diagram 500 to control an alternator system. A voltage setpoint also referred to as an alternator output voltage setpoint is set to maintain the alternator output voltage at a nominal operating voltage (e.g., 15 volts) in block 502. In block 504, a dynamic indicator such as a rate of change of the load is determined. The dynamic indicator may also be referred to as a load indicator. While the dynamic indicator is being determined in block 504, a status of large loads being supplied power is monitored in block 506. A comparison of a rate of change of the load indicator with a positive rate of change threshold is performed in block 508. In block 510, a comparison of the load indicator with a predetermined limit is performed. If both the rate of change of the load indicator is greater than the positive rate of change threshold and the load indicator is greater than the predetermined limit, the voltage setpoint will be reduced in block 512. If either of the tests in blocks 508 and 510 is false, then another reading will be performed and the test will repeat.

Once the alternator output voltage setpoint is reduced in block 512, a comparison of the rate of change of the load indicator with a negative rate of change threshold is performed in block 514. And a comparison of the load indicator with a predetermined limit is performed in block 516. If the negative rate of change of the load indicator is greater than the negative rate of change threshold or the load indicator is greater than the predetermined limit indicating that the load has been removed, the voltage setpoint will return to the operating setpoint in block 520. Also in block 518, a timer measuring the time that the voltage setpoint has been reduced is compared with a predetermined time period. If the voltage setpoint has been held in a reduced voltage level for a period of time greater than a predetermined time period, the timer will branch to block 520 and the voltage setpoint will be returned to the normal operating voltage in block 520.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle power system comprising:
   an alternator; and
   a controller configured to, responsive to a magnitude of amp hour electric charge provided by the alternator for a predetermined time period exceeding a first threshold and a slope of power output by the alternator exceeding a second threshold during the time period, reduce a voltage setpoint of the alternator by a predetermined amount, and regulate an output voltage of the alternator based on the setpoint.

2. The system of claim 1, wherein the controller is further programmed to initiate the reduction of the setpoint after a delay time that begins with the slope exceeding the second threshold.

3. The system of claim 1, wherein the magnitude and slope are indicative of a load being coupled with the alternator and wherein the controller is further configured to increase the setpoint in response to the load being disconnected from the alternator.

4. The system of claim 3, wherein the predetermined amount is based on a first extent to which the magnitude exceeds the first threshold or a second extent to which the slope exceeds the second threshold.

5. The system of claim 3, wherein the amp hour electric charge is associated with a current flowing through a field coil of the alternator.

6. A method of regulating alternator output voltage comprising:
   receiving data regarding an amount of amp hour electric charge provided by an alternator to a load and a magnitude of power output by the alternator;
   in response to the amount exceeding a first threshold and the magnitude exceeding a second threshold, reducing an output voltage setpoint of the alternator by a predetermined amount; and
   regulating the output voltage of the alternator based on the setpoint.

7. The method of claim 6 further comprising, in response to the load being disconnected from the alternator, increasing the setpoint.

8. The method of claim 6 further comprising, in response to the amount falling below a third threshold and the magnitude falling below a fourth threshold, increasing the setpoint.

9. The method of claim 6, wherein the predetermined amount is based on an extent to which the amount exceeds the first threshold or the magnitude exceeds the second threshold.

10. A vehicle power system comprising:
   an alternator; and
   a controller configured to selectively alter by a predetermined amount an output voltage setpoint for the alternator in response to a magnitude of amp hour electric charge and a slope of power output by the alternator crossing respective thresholds during a predetermined time period.

11. The system of claim 10, wherein the magnitude and slope are indicative of a load being connected with or disconnected from the alternator.

12. The system of claim 10, wherein the predetermined amount is based on an extent to which the magnitude and slope cross the respective thresholds.

13. The system of claim 10, wherein selectively altering by a predetermined amount an output voltage setpoint includes increasing by the predetermined amount the output voltage setpoint.

14. The system of claim 10, wherein selectively altering by a predetermined amount an output voltage setpoint includes decreasing by the predetermined amount the output voltage setpoint.

* * * * *